(12) United States Patent
Kobayashi et al.

(10) Patent No.: US 6,506,121 B2
(45) Date of Patent: Jan. 14, 2003

(54) CAGE FOR CONSTANT-VELOCITY JOINT AND METHOD FOR MANUFACTURING THE SAME

(75) Inventors: Masazumi Kobayashi, Shizuoka (JP); Masayuki Tanio, Shizuoka (JP); Takao Maeda, Shizuoka (JP); Takuya Katou, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/725,041

(22) Filed: Nov. 29, 2000

(65) Prior Publication Data

US 2001/0002369 A1 May 31, 2001

(30) Foreign Application Priority Data

Nov. 30, 1999 (JP) .............................. 11-339621

(51) Int. Cl.[7] .............................................. F16D 3/224
(52) U.S. Cl. ...................... 464/145; 464/143; 464/906; 148/909; 29/898.027
(58) Field of Search ................................. 464/145, 143, 464/906; 29/898.067; 148/226, 319, 906; 384/625, 912

(56) References Cited

U.S. PATENT DOCUMENTS

| 4,437,331 | A | | 3/1984 | Dore | |
|---|---|---|---|---|---|
| 5,609,527 | A | * | 3/1997 | Fuerstenau et al. | 464/145 |
| 5,692,960 | A | * | 12/1997 | Sugiyama et al. | 464/145 |
| 5,853,328 | A | * | 12/1998 | Kobayashi et al. | 464/145 |
| 6,120,382 | A | * | 9/2000 | Sone et al. | 464/145 |

* cited by examiner

Primary Examiner—Lynne H. Browne
Assistant Examiner—Aaron M Dunwoody
(74) Attorney, Agent, or Firm—Wenderoth, Lind & Ponack, L.L.P.

(57) ABSTRACT

A cage having a plurality of pockets, and a pair of end faces of each pocket formed in the cage that oppose each other in a circumferential direction of the cage are formed by surfaces cut after hardening and their surface hardness is reduced to a value lower than the surface hardness of a pair of side faces of each pocket that oppose each other in an axial direction of the cage to impart toughness to the bridge portions defined between the pockets and thus to increase the strength of the cage.

15 Claims, 6 Drawing Sheets

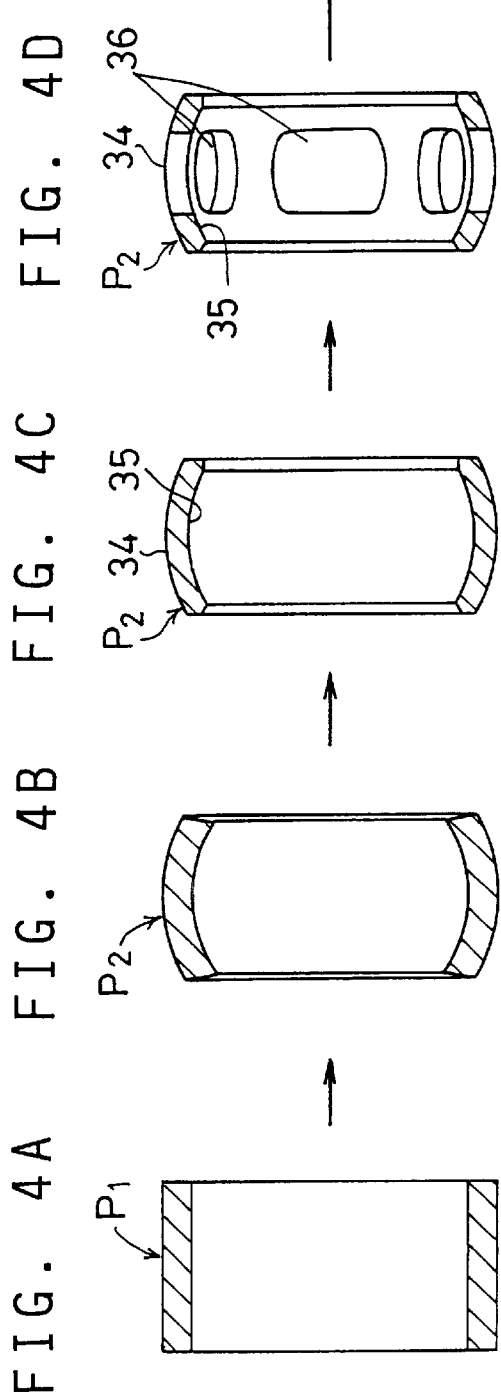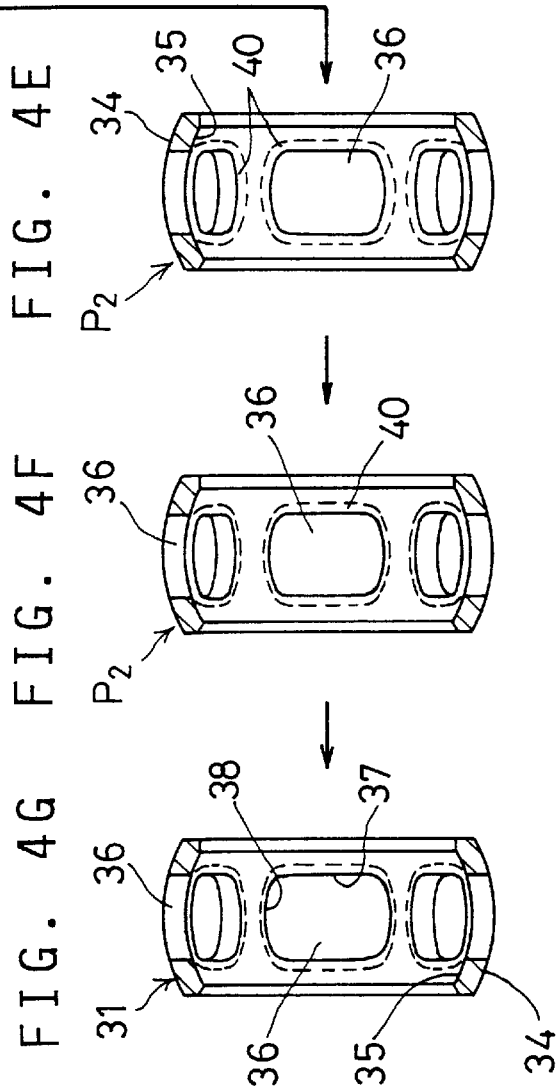

US 6,506,121 B2

CAGE FOR CONSTANT-VELOCITY JOINT AND METHOD FOR MANUFACTURING THE SAME

BACKGROUND OF THE INVENTION

1. Field of the Invention

This invention relates to a cage for a stationary type constant-velocity joint (CVJ) comprising an outer ring and an inner ring, balls through which torque is transmitted between the outer and inner rings, and a cage for retaining the balls, and a method of manufacturing the cage, and a constant-velocity joint.

2. Description of the Related Art

FIG. 5 shows a conventional stationary type CVJ, which comprises an outer ring 50 formed with a plurality of curved track grooves 54 in its spherical inner surface 51, an inner ring 52 formed with a plurality of curved track grooves 55 in its spherical outer surface 53, radially opposite to the respective track grooves 54, and balls 56 each received in a pair of radially opposed track grooves 54 and 55.

The balls 56 are retained in pockets 60 of a cage 57 disposed between the inner and outer rings 52, 50 with its outer spherical surface 58 guided by the inner spherical surface 51 of the outer ring 50 and its inner spherical surface 59 guided by the outer spherical surface 53 of the inner ring 52.

The bottoms of the track grooves 54 and 55 are curved such that their respective centers of curvature A1 and A2 are spaced (or offset) equal distances from point $O_0$ in opposite directions along the axis of the rings. When torque is transmitted with the outer ring 50 and the inner ring 52 taking a working angle, the balls 56 are always in a plane perpendicular to the bisector of the working angle, so that the output ring can always rotate at a constant speed irrespective of the working angle.

The pockets 60 of the cage 57 are elongated in the circumferential direction of the cage as shown in FIG. 6A so that the balls 56 move in the circumferential direction in the pockets while sliding along the axially opposed side faces 61 as shown in FIG. 6B when the inner and outer rings are rotating with their axes inclined relative to each other. High wear resistance is therefore required for the side faces 61.

To increase the wear resistance of the side edges 61, a conventional CVJ cage 57 is manufactured following the next seven steps as shown in FIG. 7:

Step 1: forming a short tubular member P1 as shown at (A) by cutting a pipe;

Step 2: pressing the member P1 from both ends to form a cage blank P2 having outer and inner curved surfaces;

Step 3: turning the outer and inner surfaces into spherical outer and inner surfaces 58, 59 (C);

Step 4: pressing the cage blank P2 to form pockets 60 (D);

Step 5: shaving the perimeter of each pocket 60 to cut a pair of side faces 61 until the width between the side faces 61 becomes substantially equal to the diameter of the balls 56 (E);

Step 6: subjecting the cage blank P2 to heat treatment such as carburizing to increase surface hardness; and Step 7: grinding the cage blank P2 (F) to finish spherical outer and inner surfaces 58, 59 to form a cage 57.

Because the cage blank is carburized after the pockets 60 have been formed, hardened layers 63 formed around the pockets 60 will have a uniform depth as shown in FIGS. 6A, 6B. The side faces 61 as the ball rolling surfaces have a pretty high hardness of 58–63 HRC. The cage 57 is thus sufficiently wear resistant.

When torque is transmitted with the inner and outer rings forming a working angle, tensile and torsional forces act on the cage 57. Thus, it is desirable to decrease the hardness to increase the toughness of the bridge portions 64 defined between the pockets 60.

But since the cage blank is carburized after the pockets have been formed and their side faces 61 have been finished by shaving, the hardened layers formed around the pockets 60 have a uniform depth as shown in FIG. 6B. The bridges 64 are thus high in hardness and low in toughness. Since the bridges 64 are formed by punching the pockets 60, they naturally have a trapezoidal cross-section, which means that their width (circumferential dimension) at their inner side is smaller than at their outer side. Thus, if the number of balls and thus the number of pockets are increased to increase the load-bearing capacity of the joint without increasing its outer diameter, the width of the bridge portion on the radially inner side tends to be short.

Therefore there are several points to be improved to increase the strength of such a conventional cage.

Also, with such a conventional cage 57, since the axially opposed side faces 61 of each cage 60 are finished by shaving, the width of the pockets 60 (or distances between the side faces 61) tends to vary rather widely.

Thus, in assembling a constant-velocity joint, it is necessary to classify the cages 57 into ranks according to the width of the pockets 60, classify the torque-transmitting balls into ranks according to the respective pocket widths, and adjust the gaps between the pockets 60 and the torque-transmitting balls 56. If no suitable gaps are obtainable, there arises a necessity of grinding the side faces 61 of the pockets 60. Thus, assembling is extremely troublesome and there remain points to be improved.

An object of the invention is to provide a cage for a constant-velocity joint that is high in mechanical strength, and a method of manufacturing such a cage, and a durable constant-velocity joint.

According to this invention, there is provided a cage of a stationary type constant-velocity joint having an outer ring and an inner ring. The cage has a cylindrical portion formed with a plurality of pockets at equal angular intervals to receive balls for transmitting a turning torque between the outer ring and the inner ring. The cage has a spherical outer surface kept in contact with and guided by a spherical inner surface of the outer ring and a spherical inner surface kept in contact with and guided by a spherical outer surface of the inner ring. The pockets each have a pair of end faces that are opposed to each other in a circumferential direction of the cage and a pair of side faces that are opposed to each other in an axial direction of the cage. Also, the pair of end faces are formed by cutting after hardening and have a lower surface hardness than the side faces.

The center of curvature of the spherical outer surface of the cylindrical portion may beat the same point as or spaced from the center of curvature of its spherical inner surface in an axial direction of the cylindrical portion.

By this arrangement, toughness is imparted to the bridge portions formed between the pockets and their tensile and torsional strengths are improved.

As a method for providing a lower surface hardness to a pair of the end faces of each pocket than a pair of the side faces, either of the following two methods may be adopted. One is to form the cylindrical portion of the cage with pockets from carburized case-hardened steel and cut the entire inner periphery of each pocket with the cutting depth deeper to form a smaller carburizing depth on the end faces than on the side faces, and the other is to cut only the end faces, thereby forming a smaller carburizing depth on the end faces than on the side faces.

The end faces of the pockets may be cut to inclined surfaces that incline so as to diverge radially outwardly.

On the constant-velocity joint comprising an outer ring, an inner ring and a cage mounted between the outer ring and the inner ring so that the center of curvature of the spherical outer surface of the cage is axially spaced from the center of curvature of the spherical inner surface of the cage, when torque is transmitted with the outer ring and the inner ring taking a working angle therebetween, the balls received in the pockets of the cage move along a path forming a figure "8" which is larger at its radially outer half than at its radially inner half. By forming the end faces of each pocket into inclined surfaces that incline so as to diverge radially outwardly, the width of each bridge portion at its inner side is increased. This increases the strength of the bridge portions.

According to this invention, there is also provided a method of manufacturing a cage of a constant-velocity joint comprising the steps of turning outer and inner surfaces of a tubular cage blank to form spherical outer and inner surfaces, pressing the cage blank to form a plurality of pockets at equal angular intervals, hardening the cage blank by carburizing, grinding the spherical outer and inner surfaces of the cage blank after heat treatment, and cutting a pair of end faces of each of the pockets so that the pair of end faces will have a lower surface hardness than a pair of side faces of the pockets.

By adopting such a method, a cage is provided which has bridge portions having toughness and which has a high mechanical strength.

According to this invention, there is also provided a stationary constant-velocity joint comprising an outer ring, an inner ring, the outer ring being formed with a plurality of curved track grooves in a spherical inner surface thereof and the inner ring being formed with a plurality of curved track grooves in a spherical outer surface thereof. The center of curvature of the track grooves of the outer ring and the center of curvature of the track grooves of the inner ring are offset by equal distances in opposite directions from the angular center of the joint. Torque-transmitting balls are mounted between the track grooves formed in the outer ring and the track grooves formed in the inner ring. Also included is a cage having a cylindrical portion formed with a plurality of pockets at equal angular intervals to receive the balls for transmitting a turning torque between the outer ring and the inner ring. The invention is characterized in that the pockets each have a pair of end faces that oppose each other in a circumferential direction of the cage and a pair of side faces that oppose each other in an axial direction of the cage, and the pair of end faces are formed by cutting after hardening and have a lower surface hardness than the pair of side faces.

BRIEF DESCRIPTION OF THE DRAWINGS

FIGS. 4A–4G are views showing manufacturing steps of the cage;

DETAILED DESCRIPTION OF THE PREFERRED EMBODIMENT

Figure 1:
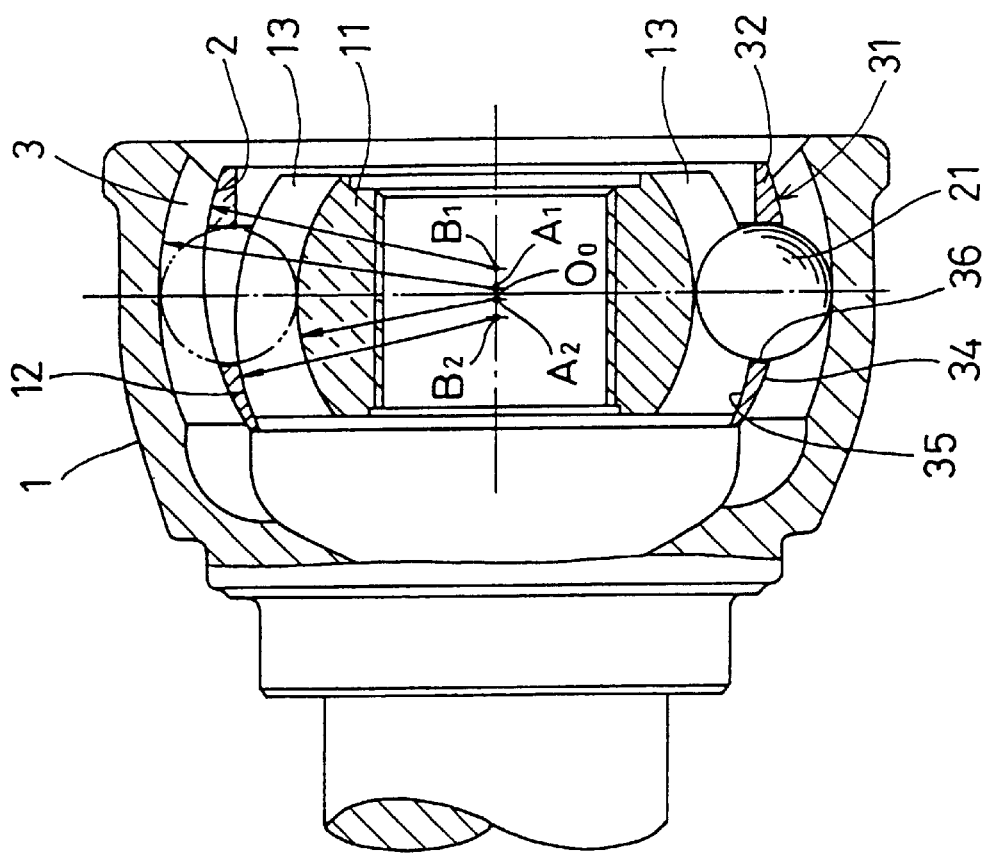
FIG. 1 is a partially cutaway front view of a constant-velocity joint according to this invention.

FIGS. 1–4 show an embodiment of the present invention. A constant-velocity joint shown in FIG. 1 comprises an outer ring 1, an inner ring 11, torque-transmitting balls 21 and a cage 31.

The outer ring 1 has a spherical inner surface 2 formed with eight curved ball grooves 3 at equal circumferential intervals.

The inner ring 11 has a spherical outer surface 12 formed with curved ball grooves 13, as many as the ball grooves 3, at equal circumferential intervals.

The bottoms of the ball grooves 3 and 13 are curved so that their respective centers of curvature A1 and A2 are spaced (offset) equal distances from center point $O_0$ of the coupling in opposite directions along the axis of the rings.

Through balls 21 mounted between the ball grooves 3 of the outer ring 1 and the ball grooves 13 of the inner ring 11, torque is transmitted between the rings 1 and 11.

Figure 2:
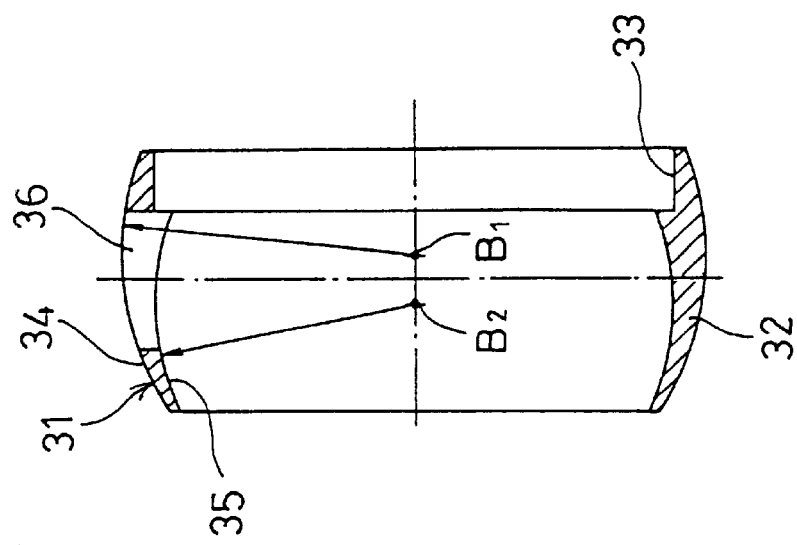
FIG. 2 is a sectional view showing a cage of the constant-velocity joint shown in FIG. 1.

FIG. 2 shows a cage 31, which has a cylindrical portion 32 formed at one end thereof with an inlow 33 having a diameter substantially equal to the outer diameter of the inner ring 11. The cylindrical portion 32 has a spherical outer surface 34 guided by the spherical inner surface 2 of the outer ring 1 and a spherical inner surface 35 guided by the spherical outer surface 12 of the inner ring 1.

The centers of curvature B1 and B2 of the spherical outer and inner surfaces 34, 35 are axially spaced (offset) from each other equal distances from center point $O_0$ in opposite directions along the axis of the rings when the cage 31 is mounted between the outer ring 1 and the inner ring 11.

The distance between each center of curvature B1, B2 and point $O_0$ may be greater than, or equal to the distance between each center of curvature A1, A2 of the ball grooves 3 and 13 and point $O_0$. If the former is equal to the latter, the centers of curvature B1, B2 coincide with the respective centers of curvature A1, A2.

Figure 3A:
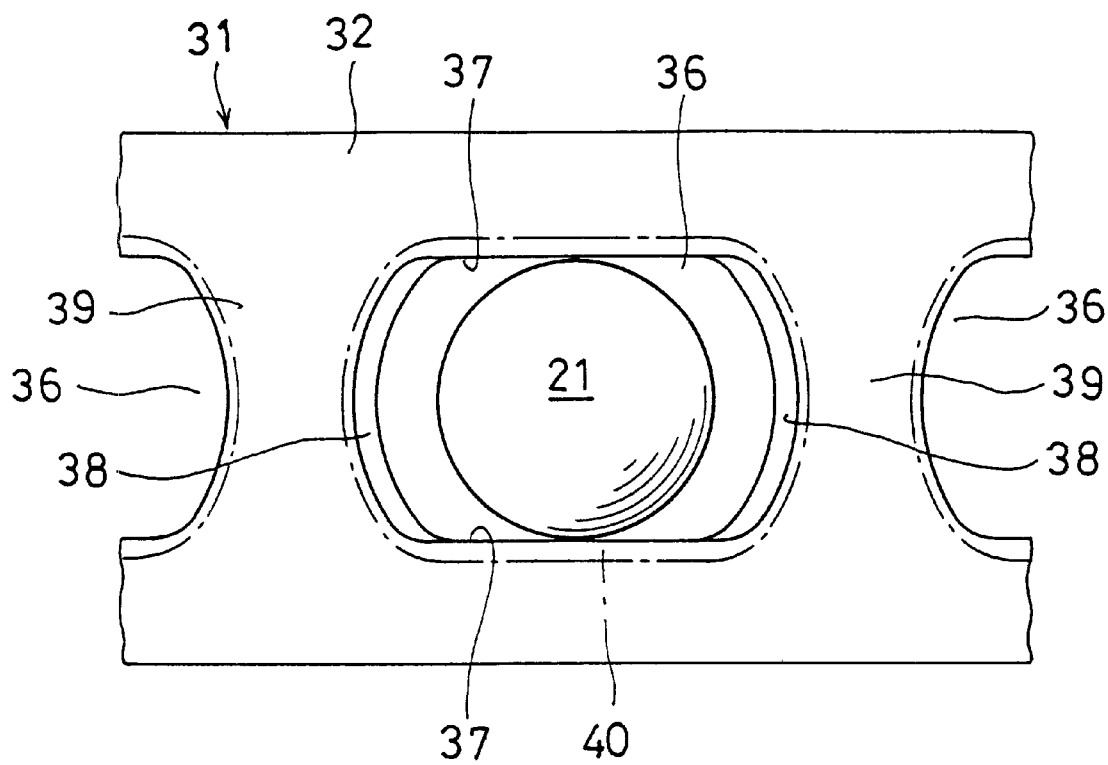
FIG. 3A is a plan view showing a portion of the cage shown in FIG. 2.

As shown in FIG. 3A, the cage 31 is formed with pockets 36 in which are received the balls 21. The pockets have a pair of axially opposed parallel side faces 37. The distance therebetween (or width of the pocket) is substantially equal to the diameter of the balls 21. The balls roll on the side faces 37.

Figure 3B:
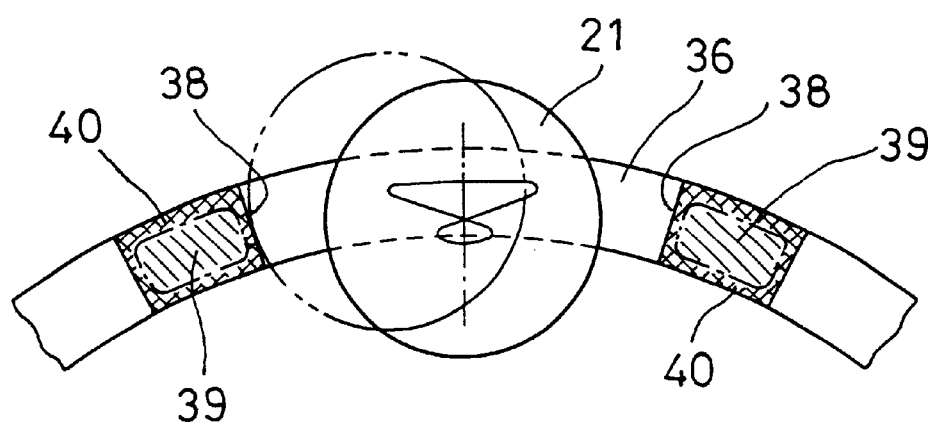
FIG. 3B is a sectional view of the cage shown in FIG. 2.

When the joint is transmitting a torque with the outer and inner rings 1 and 11 forming a working angle, the center of each ball 21 moves in the pocket 36 drawing a locus like the letter "8" as seen in cross-section in FIG. 3B.

The ball 21 moves so that the radially outer half portion of the letter "8" is bigger than its radially inner half portion. This is because the centers of curvature B1 and B2 are offset in opposite directions from point $O_0$.

With the outer ring 1 and the inner ring 11 inclined relative to each other so that one of the pockets 36 of the cage 31 will be positioned outside of the outer ring 1, the torque-transmitting balls 21 are mounted one by one in the respective pockets 36. During mounting, the balls 21 that have been mounted first move forming the figure "8" that is large on the radially outer side and small on the radially inner side. The amount of their movement is greater than the amount of movement of the balls 21 during torque transmission.

Thus, if a pair of circumferentially opposing end faces 38 of each pocket 36 are parallel to each other as seen in cross-section, bridge portions 39 having a generally trapezoidal cross-section are formed between the pockets 36. Such bridge portions 39 are narrow in width at their radially inner portion and thus low in strength.

In the embodiment, as shown in FIG. 3B, the end faces 38 of each pocket 36 are oblique so as to diverge radially outwardly. They may have a straight cross-section as shown or may be recessed complementarily to the outer periphery of the balls 21.

Since the end faces 38 diverge radially outwardly, the bridge portions 39 have a greater width at their radially inner portion. The strength of the cage 31 thus increases.

When the joint transmits a torque with the inner and outer rings 1 and 11 forming a working angle, the balls 21 roll on the axially opposed side faces 37. Thus, high hardness is required for the side faces 37.

Figure 6A:
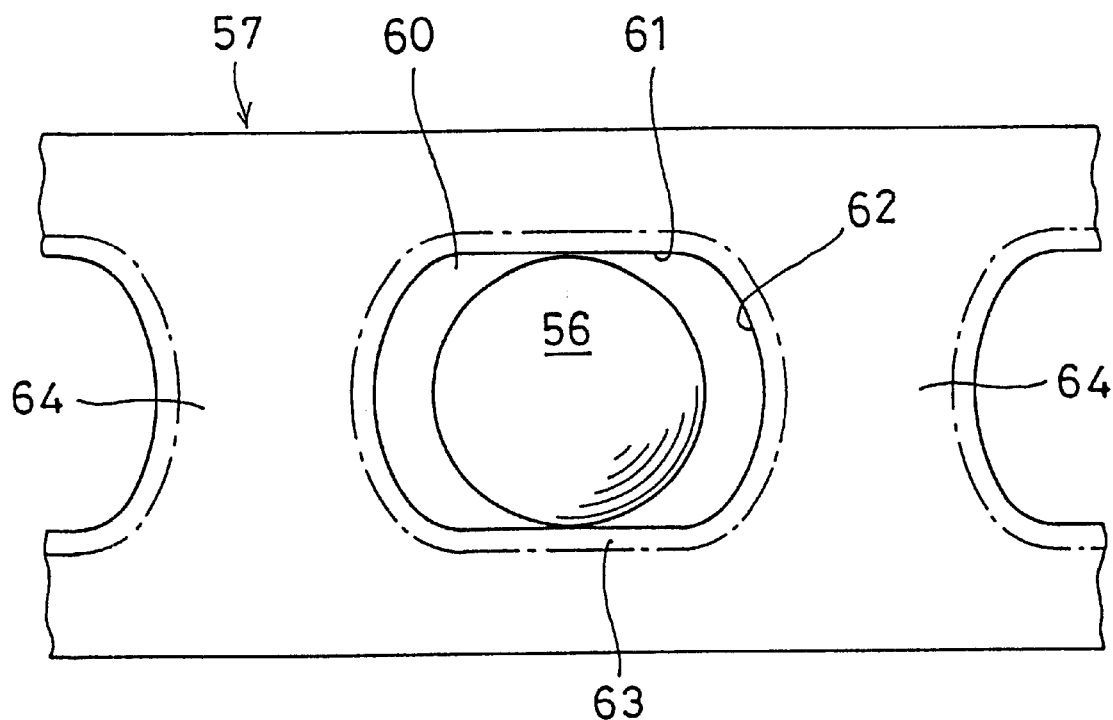
FIG. 6A is a plan view showing a portion of the cage of the conventional constant-velocity joint same.
Figure 6B:
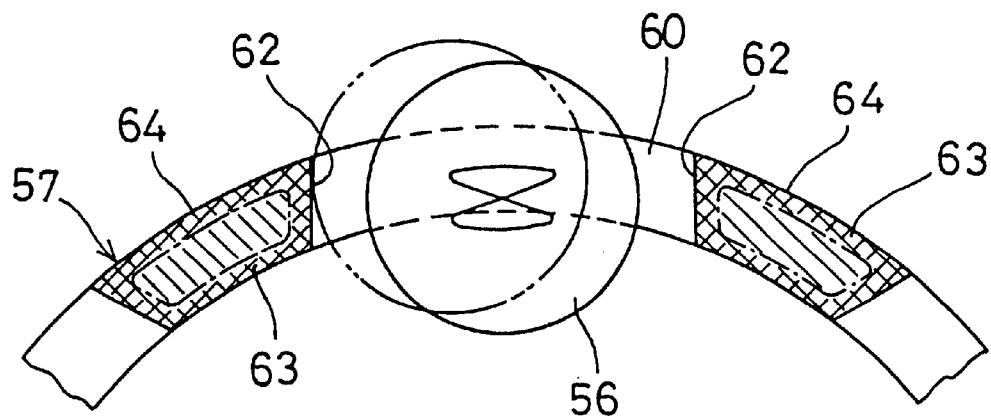
FIG. 6B is a sectional view of the conventional cage shown in FIG. 6A.
Figure 7:
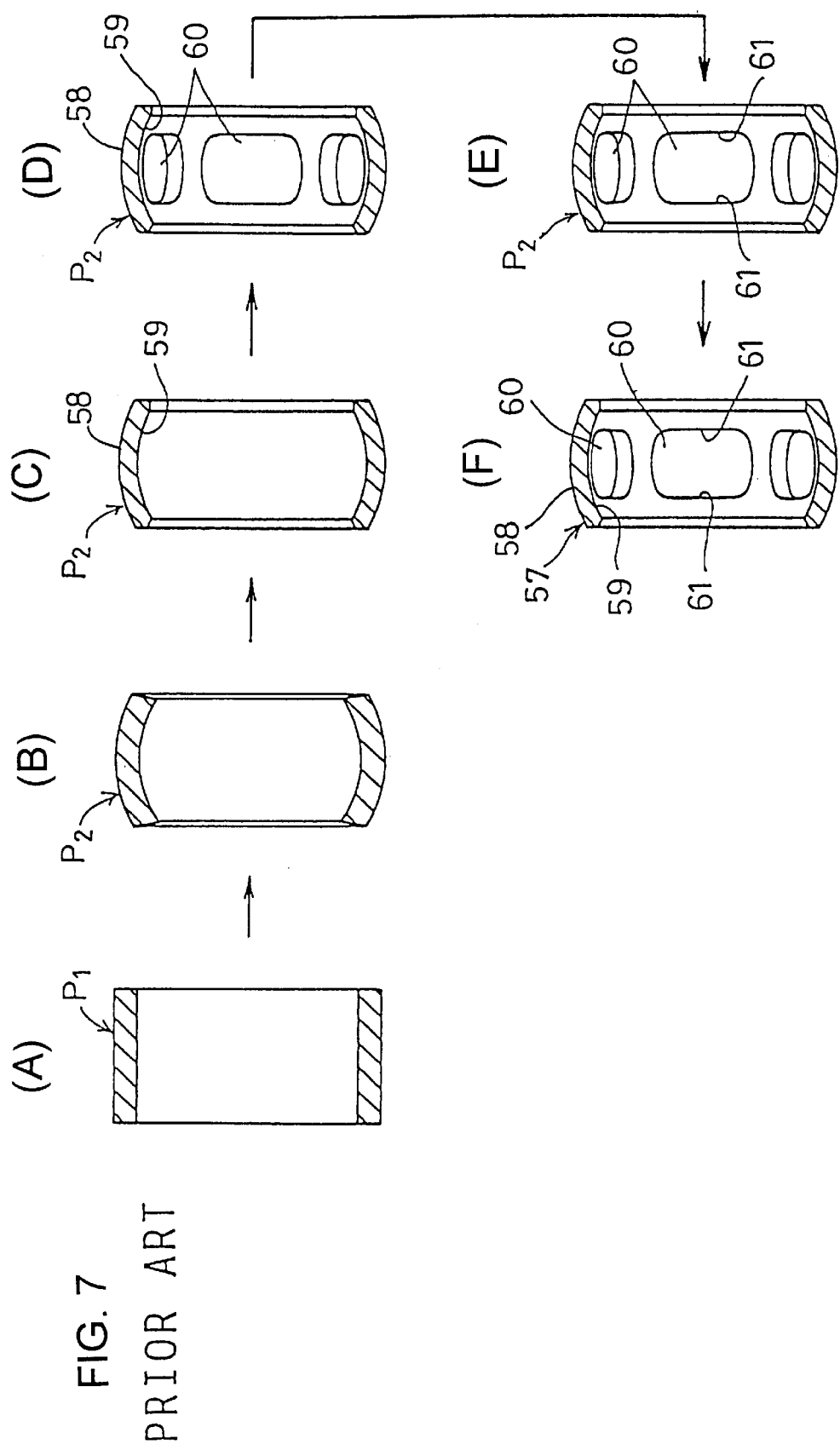
FIG. 7 shows the manufacturing steps of a cage of a conventional constant velocity joint.

In the conventional arrangement of FIGS. 6A, 6B, the cage 57 is subjected to carburizing to increase the hardness of the side faces 61. But since the hardened layers formed around the pockets 60 had a uniform depth, the toughness of the bridge portions 64 was insufficient. This lowers the strength of the cage.

In the embodiment, in order to solve this problem, a cage 31 made from low-carbon (such as SCr415 or SCM415) case-hardened steel (hardness: 25–45 HrC) and formed with pockets 36 is first hardened by carburizing. Then, the end faces 38 of each pocket 36 are subjected to cutting so that they will have a lower hardness than the axially opposing side faces 37.

Both of the side faces 37 and the end faces 38 may be cut, or only the end faces may be cut. If both are cut, they should be cut to different depths so that they will have different surface hardnesses.

Since the end faces 38 are lower in hardness than the side faces 37, the bridge portions 39 have higher toughness. This increases the strength of the cage 31.

FIG. 4 shows a method of manufacturing the cage 31 of the present invention, which comprises the following steps:
Step 1: cutting a pipe made of SCr415 or SCM415 to form a tubular member P1 (FIG. 4A);
Step 2: pressing the tubular member P1 from both ends to form a cage blank P2 having arcuate inner and outer surfaces (FIG. 4B);
Step 3: turning the inner and outer surfaces of the cage blank P2 to form spherical outer and inner surfaces 34, 35 (FIG. 4C);
Step 4: pressing the cage blank P2 to form a plurality of pockets 36 (FIG. 4D);
Step 5: hardening the cage blank P2 by carburizing to form a hardened layer 40 having a depth of 0.45–1.00 mm and a surface hardness of 58-63 HRC around each pocket 36 as shown by dot line in FIG. 4E;
Step 6: finishing the spherical outer and inner surfaces 34, 35 of the hardened cage blank P2 by grinding (FIG. 4F); and
Step 7: cutting the inner wall of each pocket 36 to adjust its dimension. In Step 7, the side faces 37 are cut to a smaller depth than the end faces 38 so that the latter will have a lower hardness than the former.

If the side faces 37 are not cut after carburizing, they are shaved before carburizing to adjust the width of the pockets (or distance between the side faces) to a predetermined size.

Since with this cage manufacturing method the inner wall of the pockets 36 is cut after the cage blank has been hardened by carburizing, the end faces 38 of each pocket can be worked so as to diverge radially outwardly (FIG. 3B). This increases the toughness of the bridge portions 39.

When the pocket width is adjusted to a predetermined width dimension by cutting the pair of side faces 37, the machining tolerance of the pocket width may be smaller than when it is adjusted by shaving.

In this case, in assembling the constant-velocity joint, it is possible to omit classification of cages 31 and torque-transmitting balls 21 into ranks and thus to reducing the assembling cost.

The cage of FIG. 1 has eight pockets 36 and the centers of curvature B1 and B2 of the outer and inner surfaces 34, 35 are axially offset. But the concept of the present invention is applicable to cages and CVJs of different types.

Figure 5:
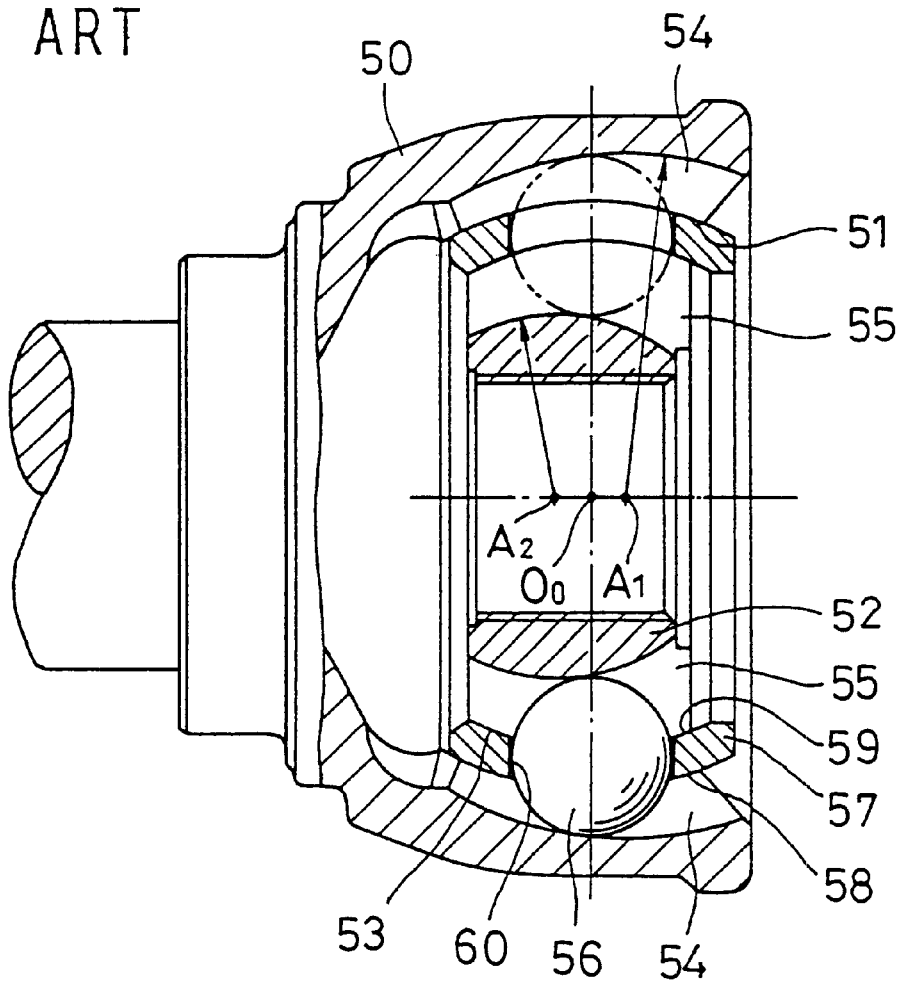
FIG. 5 is a partially cutaway front view showing a conventional constant-velocity joint.

For example, this invention is applicable to the cage and CVJ shown in FIG. 5. The CVJ of this particular example has six balls and the cage 57 has spherical outer and inner surfaces 58, 59 whose centers of curvature are on the angle center of the joint.

With this type of joint, when the joint transmits a torque with the rings 50, 52 forming a working angle, the center of each ball 56 moves in the pocket forming a radially symmetrical letter "8" in cross-section (FIG. 6B). Thus, the circumferentially opposing end faces 62 of each pocket are parallel to each other as seen in section.

Since the end faces 62 are formed by cutting so that they are lower in hardness than the side faces 61, the bridge portions 64 have a larger toughness like the cage 31 shown in FIG. 4F. The cage 57 thus has a greater strength and the constant-velocity joint has improved durability.

According to this invention, since the pair of end faces of the pockets formed in the cage are formed by surfaces formed by cutting after hardening so that the surface hardness of the end faces is lower than that of the pair of side faces of the pockets, which are opposed in the axial direction of the cage, it is possible to impart toughness to the bridge portions formed between the pockets. Thus, the tensile and torsional strength of the bridge portions improve and strength of the cage is improved.

We claim:

1. A heat-treated cage of a stationary type constant-velocity joint having an outer ring and an inner ring, said cage having a cylindrical portion formed with a plurality of pockets at equal angular intervals to receive balls for transmitting a turning torque between said outer ring and said inner ring, said cage having a spherical outer surface kept in contact with and guided by a spherical inner surface of said outer ring and a spherical inner surface kept in contact with and guided by a spherical outer surface of said inner ring,
wherein each of said pockets has a pair of machined end faces that oppose each other in a circumferential direction of the cage and a pair of side faces that oppose each other in an axial direction of the cage, and said pair of machined end faces have a lower surface hardness than said pair of side faces that oppose each other in an axial direction of the cage.

2. The cage of claim 1, wherein the spherical inner surface of said cylindrical portion has a center of curvature, and the spherical outer surface of said cylindrical portion has a center of curvature, and the center of curvature of the spherical outer surface of said cylindrical portion is spaced from the center of curvature of the spherical inner surface of said cylindrical portion in an axial direction of said cylindrical portion.

3. The cage of claim 2 wherein said cylindrical portion is made of case-hardened steel hardened by carburizing.

4. A The cage of claim 2 wherein only said pair of end faces of said pockets are formed by cutting after hardening.

5. The cage of claim 2 wherein said pair of end faces of said pockets are inclined surfaces that incline so as to diverge radially outwardly.

6. The cage of claim 2 wherein the number of said pockets formed in said cylindrical portion is eight.

7. The cage of claim 1 wherein said cylindrical portion is make of case-hardened steel hardened by carburizing.

8. The cage of claim 7 wherein only said pair of end faces of said pockets are formed by cutting after hardening.

9. The cage of claim 7 wherein said pair of end faces of said pockets are inclined surfaces that incline so as to diverge radially outwardly.

10. The cage of claim 7 wherein the number of said pockets formed in said cylindrical portion is eight.

11. The cage of claim 1 wherein said pair of end faces of said pockets are inclined surfaces that incline so as to diverge redially outwardly.

12. The cage of claim 4 wherein the number of said pockets formed in said cylindrical portion is eight.

13. The cage of claim 1 wherein the number of said pockets formed in said cylindrical portion is eight.

14. A method of manufacturing a cage of a constant-velocity joint, the method comprising;

turning outer and inner surfaces of a tubular cage blank to form spherical outer and inner surfaces;

pressing said cage blank to form a plurality of pockets at equal regular intervals;

hardening said cage blank by carburizing;

grinding said spherical outer and inner surfaces of said cage blank after heat treatment; and cutting a pair of end faces of each of said pockets so that said pair of end faces will have a lower surface hardness than a pair of side faces of each of said pockets.

15. A stationary constant-velocity joint comprising an outer ring, an inner ring, said outer ring being formed with a plurality of curved track grooves in a spherical inner surface thereof and said inner ring being formed with a plurality of curved track grooves in spherical outer surface thereof, the center of curvature of said track grooves of said outer ring and the center of curvature of said track grooves of said inner ring being offset by equal distances in opposite directions from the angular center of the joint, a plurality of torque-transmitting balls mounted between said track grooves formed in said outer ring and said track grooves formed in said inner ring, and a heat-treated cage having a cylindrical portion formed with a plurality of pockets at equal angular intervals to receive said balls for transmitting a turning torque between said outer ring and said inner ring, wherein said pockets each have a pair of machined end faces that oppose each other in a circumferential direction of the cage and a pair of side faces that oppose each other in an axial direction of the cage, and said pair of machined end faces have a lower surface hardness than said pair of side faces that oppose each other in an axial direction of the cage.

* * * * *